US010663899B2

(12) United States Patent
Shinoya

(10) Patent No.: US 10,663,899 B2
(45) Date of Patent: May 26, 2020

(54) IMAGE FORMING APPARATUS

(71) Applicant: BROTHER KOGYO KABUSHIKI KAISHA, Nagoya-shi, Aichi-ken (JP)

(72) Inventor: Shota Shinoya, Nisshin (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/534,308

(22) Filed: Aug. 7, 2019

(65) Prior Publication Data

US 2020/0073305 A1 Mar. 5, 2020

(30) Foreign Application Priority Data

Aug. 29, 2018 (JP) ................................ 2018-160662

(51) Int. Cl.
*G03G 15/20* (2006.01)
*G03G 15/00* (2006.01)
*F16C 13/00* (2006.01)

(52) U.S. Cl.
CPC ................................ *G03G 15/2064* (2013.01)

(58) Field of Classification Search
CPC ................................................ G03G 15/2064
See application file for complete search history.

(56) References Cited

U.S. PATENT DOCUMENTS

2014/0294415 A1* 10/2014 Maruta ................. G03G 15/80 399/67
2015/0217953 A1 8/2015 Hijikata

FOREIGN PATENT DOCUMENTS

JP 2015-163958 A 9/2015
JP 2018-028584 A 2/2018

* cited by examiner

*Primary Examiner* — David M. Gray
*Assistant Examiner* — Michael A Harrison
(74) *Attorney, Agent, or Firm* — Scully Scott, Murphy & Presser, PC

(57) ABSTRACT

A fuser includes a heater, a presser, a support member that supports the presser to allow the presser to move between a nip position where the presser is in pressured contact with the heater, and a separated position where the presser is separated from the heater, a first spring, a first cam, a first gear, a second gear, a second spring, and a second cam. The second cam has a cam profile that, when the presser moves from the separated position to the nip position, causes the second gear to move in a direction along a second axis against urging force of the second spring to increase the urging force of the second spring.

14 Claims, 12 Drawing Sheets

IMAGE FORMING APPARATUS

CROSS-REFERENCE TO RELATED APPLICATION

This application claims priority from Japanese Patent Application No. 2018-160662 filed on Aug. 29, 2018, the content of which is incorporated herein by reference in its entirety.

TECHNICAL FIELD

Aspects described herein relate to an image forming apparatus including a fuser.

BACKGROUND

A known electrophotographic image forming apparatus includes a fuser including a heat roller, a pressure roller, a spring, and a cam. The pressure roller is configured to move between a nip position and a nip release position. At the nip position, the pressure roller is in pressured contact with the heat roller with the aid of the spring and the cam. At the nip release position, the pressure roller is separated from the heat roller.

The cam receives drive force from a drive source, via a plurality of gears. The drive force from the drive source causes the cam to rotate in a particular rotating direction (e.g., forward direction), thereby moving the pressure roller from the nip position to the nip release position against an urging force of the spring. Mating teeth of the gears located between the cam and the drive source have backlash.

When the pressure roller moves from the nip release position to the nip position, the cam may be applied with a moment to urge the rotation of the cam in the forward direction due to an urging force of the spring. The moment may cause the cam to rotate in the forward direction at a higher rotating speed (what is called "forward slip") than its regular rotating speed of the cam. The backlash between the mating teeth of the gears may cause noises during the forward slip of the cam.

The fuser includes a braking mechanism configured to brake the faster rotation of the cam caused by the urging force of the spring, thereby preventing or reducing noises attributable to backlash. The braking mechanism includes a partial gear having a missing gear section on a peripheral portion of the partial gear, and a full gear having gear teeth on an entire peripheral portion of the full gear. The partial gear is configured to rotate together with the cam. The full gear is connected to a torque limiter. When the pressure roller is moved from the nip release position to the nip position, the partial gear engages the full gear. The force of the torque limiter may brake or slow the faster rotation of the cam caused by the urging force of the spring.

SUMMARY

When a tooth next to the missing gear section of the partial gear engages with the full gear, the tooth may receive entire load of the full gear.

One or more aspects of the disclosure provide an image forming apparatus including a fuser including a pressure roller, a cam configured to rotate to move a pressure roller between a nip position and a nip release position, and a braking mechanism configured to brake a rotation of the cam.

According to one or more aspects, an electrophotographic image forming apparatus may comprise a fuser including a heater, a presser, a support member, a first spring, a first cam, a first gear, a second gear, a second spring, and a second cam. The heater may be configured to apply heat to a sheet. The presser may be disposed facing the heater. The support member may support the presser to allow the presser to move between a nip position where the presser is in pressured contact with the heater, and a separated position where the presser is separated from the heater. The first spring may urge the presser toward the heater. The first cam may be configured to rotate in contact with the support member about a first axis, thereby moving the presser between the separated position and the nip position. The first gear may be configured to rotate about the first axis together with the first cam. The first gear may have a predetermined number of gear teeth. The second gear may be engaged with the first gear and have the predetermined number of gear teeth. The second gear may be configured to rotate about a second axis and to move in a direction along the second axis. The second spring may urge the second gear in the direction along the second axis. The second cam may be configured to rotate together with the second gear. The second cam may be configured to move the second gear in the direction along the second axis, against urging force of the second spring. The second cam may have a cam profile that, when the presser moves from the separated position to the nip position, causes the second gear to move in the direction along the second axis against the urging force of the second spring to increase the urging force of the second spring.

According to one or more aspects, an electrophotographic image forming apparatus may have a fuser. The fuser may comprise a heat roller, a pressure roller, a support member, a first spring, a first cam, a first gear, a second gear, a second spring, and a second cam. The pressure roller may be disposed facing the heat roller. The support member may support the pressure roller to be movable between a nip position where the pressure roller is in contact with the heat roller and a separated position where the pressure roller is separated from the heat roller. The first spring may urge the pressure roller toward the heat roller. The first cam may be in contact with the support member. The first gear may have a particular number of gear teeth. The first gear may be rotatable about a first axis together with the first cam. The second gear may have the particular number of gear teeth. The second gear may engage with the first gear and be rotatable about a second axis and movable along the second axis. The second spring may urge the second gear along the second axis. The second cam may be rotatable and movable together with the second gear. A cam profile of the first cam and a cam profile of the second cam may be determined such that a rotation of the first cam causes the pressure roller to move from the separated position to the nip position, and causes the first gear to rotate about the first axis; the rotation of the first gear causes the second gear to rotate about the second axis; the rotation of the second gear causes the second cam to rotate about the second axis; the rotation of the second cam causes the second gear to move along the second axis; and the movement of the second gear causes the second spring to be compressed.

DETAILED DESCRIPTION

Referring to FIGS. 1-12, illustrative embodiments will be described below.

[Configuration of Image Forming Apparatus]

Figure 1:
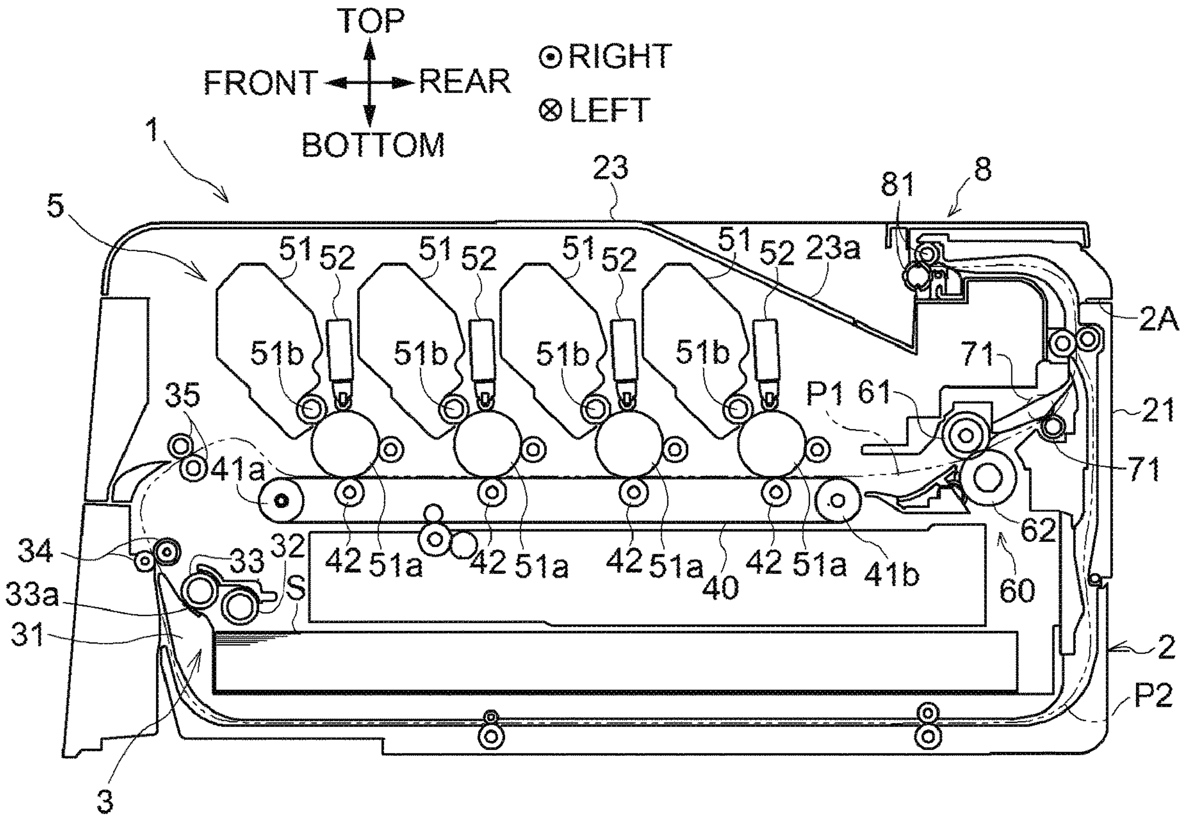
FIG. 1 is a cross-sectional view of an image forming apparatus including a fuser in an illustrative embodiment according to one or more aspects of the disclosure.

An image forming apparatus 1, as depicted in FIG. 1, according to an illustrative embodiment is an electrophotographic laser color printer configured to form an image in a plurality of colors on a sheet S. Examples of the sheet S may include a paper sheet and an OHP transparency film sheet.

In the following description, directional terminology, such as "top/upper," "bottom/lower," "front," "rear," "left," "right" etc., as labeled in the drawings, may be used. With respect to the page of FIG. 1, the left side may be defined as the front; the right side may be defined as the rear; out of the page may be defined as the right; into the page may be defined as the left; the upper side may be defined as the top, and the lower side may be defined as the bottom. Because the disclosed components can be positioned in a number of different orientations, the directional terminology is used for purposes of illustration and is in no way limiting.

The image forming apparatus 1 includes a casing 2, a sheet feed unit 3 configured to feed a sheet S, an image forming unit 5 configured to form an image on the sheet S, and a sheet discharge unit 8 configured to output the sheet S having the image formed thereon to an exterior of the casing 2.

The casing 2 has a substantially rectangular parallelepiped shape. The casing 2 houses therein various units and components, such as the sheet feed unit 3, the image forming unit 5, and the sheet discharge unit 8. The casing 2 has an opening 2A having an open end facing rearward, and a rear cover 21 that opens or closes the opening 2A. The casing 2 has an upper surface covered by an upper cover 23. The upper cover 23 has an output tray 23*a* extending downward in a direction from the front toward the rear of the image forming apparatus 1.

The sheet feed unit 3 includes a sheet cassette 31, a feed roller 32, a separation roller 33, a separation pad 33*a*, conveying rollers 34, and registration rollers 35. In the casing 2, a first conveying path P1 is defined. The first conveying path P1 extends from the sheet cassette 31 to the sheet output tray 23*a* through the image forming unit 5.

The sheet cassette 31 is configured to hold a stack of one or more sheets S. The sheets S held in the sheet cassette 31 is fed to the first conveying path P1, by the feed roller 32, the separation roller 33 and the separation pad 33*a*. The sheet S fed to the first conveying path P1 is conveyed toward the image forming unit 5 by the conveying rollers 34 and the registration rollers 35.

The image forming unit 5 is disposed above the sheet feed unit 3. The image forming unit 5 includes four drum units 51 arranged in the front-rear direction. The four drum units 51 respectively correspond to four colors of black, yellow, magenta, and cyan. Each drum unit 51 includes a photosensitive drum 51*a* and a developing roller 51*b*. The image forming unit 5 includes four exposure LED heads 52 corresponding to the respective four colors, and a fuser 60 disposed downstream of the photosensitive drums 51*a* in a conveyance direction of the sheet S. (The conveyance direction of the sheet S will be hereinafter referred to as the "sheet conveyance direction.")

The image forming apparatus 1 further includes a transfer belt 40 disposed below the image forming unit 5 across the first conveying path P1. The transfer belt 40 is looped over a drive roller 41*a* and a driven roller 41*b* disposed to the rear of the drive roller 41*a* Within the loop of the transfer belt 40, four transfer rollers 42 are disposed at positions facing the respective photosensitive drums 51*a*. In other words, the transfer belt 40 is disposed between the transfer rollers 42 and the photosensitive drums 51*a*.

The image forming unit 5 is configured to form an electrostatic latent image on a surface of each photosensitive drum 51*a*. The surface of the photosensitive drum 51*a* is uniformly charged by a charger and is selectively exposed to a beam of light by the corresponding exposure LED head 52, thereby discharging a particular area of the surface. This may create an electrostatic latent image on the particular area of the surface of the photosensitive drum 51*a*.

The developer roller 51*b* is applied with a developing bias. When the particular areas on the surface of the photosensitive drum 51*a* having the electrostatic latent image is opposed to the developing roller 51*b*, toner on the developer roller 51*b* adheres to the particular area, due to a potential difference between the electrostatic latent image and the developing roller 51*b*. Thus, a toner image is formed on the surface of the photosensitive drum 51*a*.

The sheet S fed toward the image forming unit 5 reaches the transfer belt 40 and is conveyed by the transfer belt 40 so as to sequentially pass the respective photosensitive drums 51*a*. When the toner image on each photosensitive drum 51*a* is opposed to the sheet S, the toner image may be transferred onto a surface of the sheet S by a transfer bias applied to the corresponding transfer roller 42.

The sheet S having the toner image transferred thereon is conveyed to the fuser 60. The fuser 60 includes a heat roller 61 configured to apply heat to the sheet S, and a pressure roller 62 disposed facing the heat roller 61. The heat roller 61 and the pressure roller 62 are pressed against each other. The toner image on the sheet S is thermally fixed by the fuser 60 while the sheet S passes through a portion between the heat roller 61 and the pressure roller 62.

The heat roller 61 is an example of a "heater" as claimed. Alternatively, an endless belt or an endless film may be an example of the heater as claimed. The pressure roller 62 is an example of a "presser" as claimed. Alternatively, an endless belt or an endless film may be an example of the presser as claimed.

The sheet S having the toner image thermally fixed thereon is conveyed in the sheet conveyance direction by conveying rollers 71. The conveying rollers 71 are disposed downstream of the heat roller 61 and the pressure roller 62 in the sheet conveyance direction.

The discharge unit 8 includes discharge rollers 81. The sheet S conveyed by the conveying rollers 71 is further conveyed in the sheet conveyance direction by the discharge rollers 81 to the output tray 23*a* on the upper cover 23.

For duplex printing, the sheet S having an image formed on one side thereof by the image forming unit 5 may be reintroduced to the image forming unit 5 through a second conveying path P2 defined in the casing 2. The sheet S reintroduced to the image forming unit 5 through the second conveying path P2 may have an image formed on the other side of the sheet S. Thereafter, the sheet S may be discharged to the output tray 23*a* by the discharge rollers 81.

The image forming unit 1 thus performs duplex printing on each side of the sheet S.

First Embodiment of Fuser

The fuser 60 according to a first illustrative embodiment will now be described.

Figure 2:
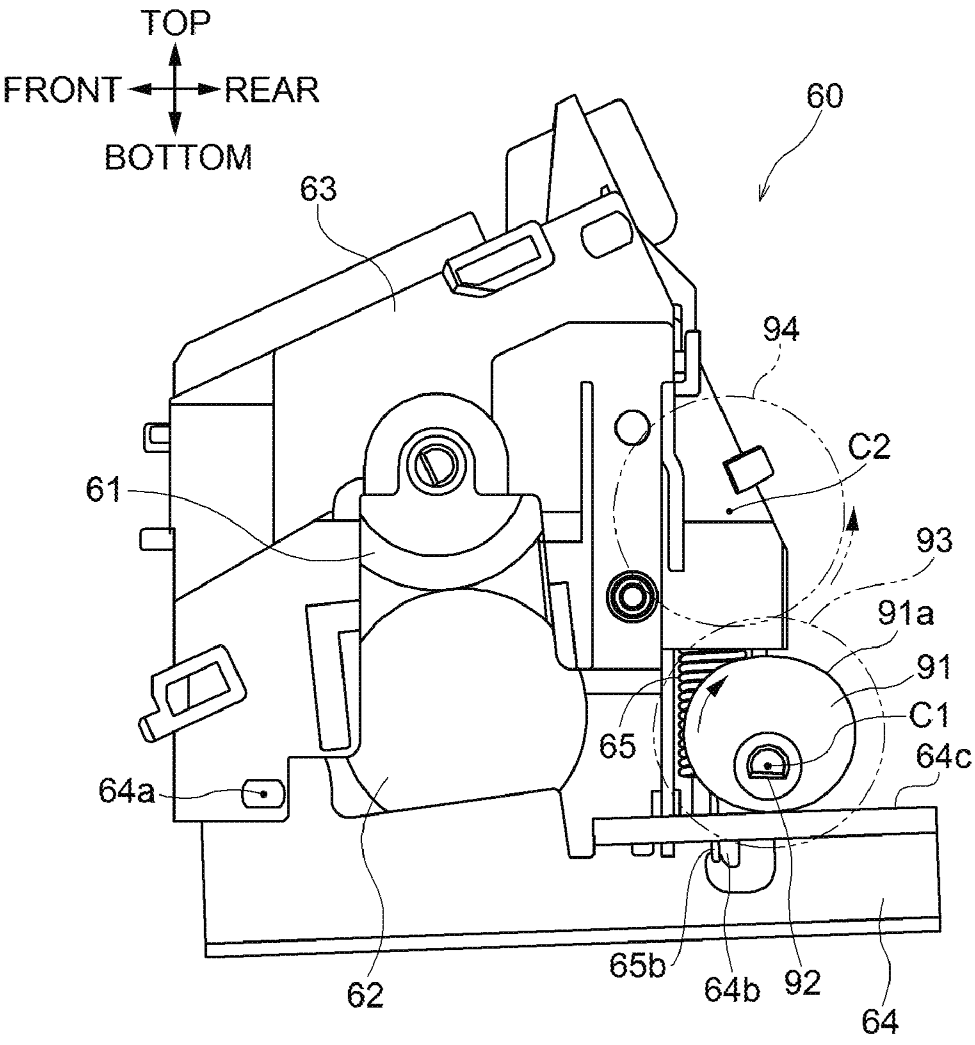
FIG. 2 is a side view of a fuser in a first illustrative embodiment according to one or more aspects of the disclosure.
Figure 3:
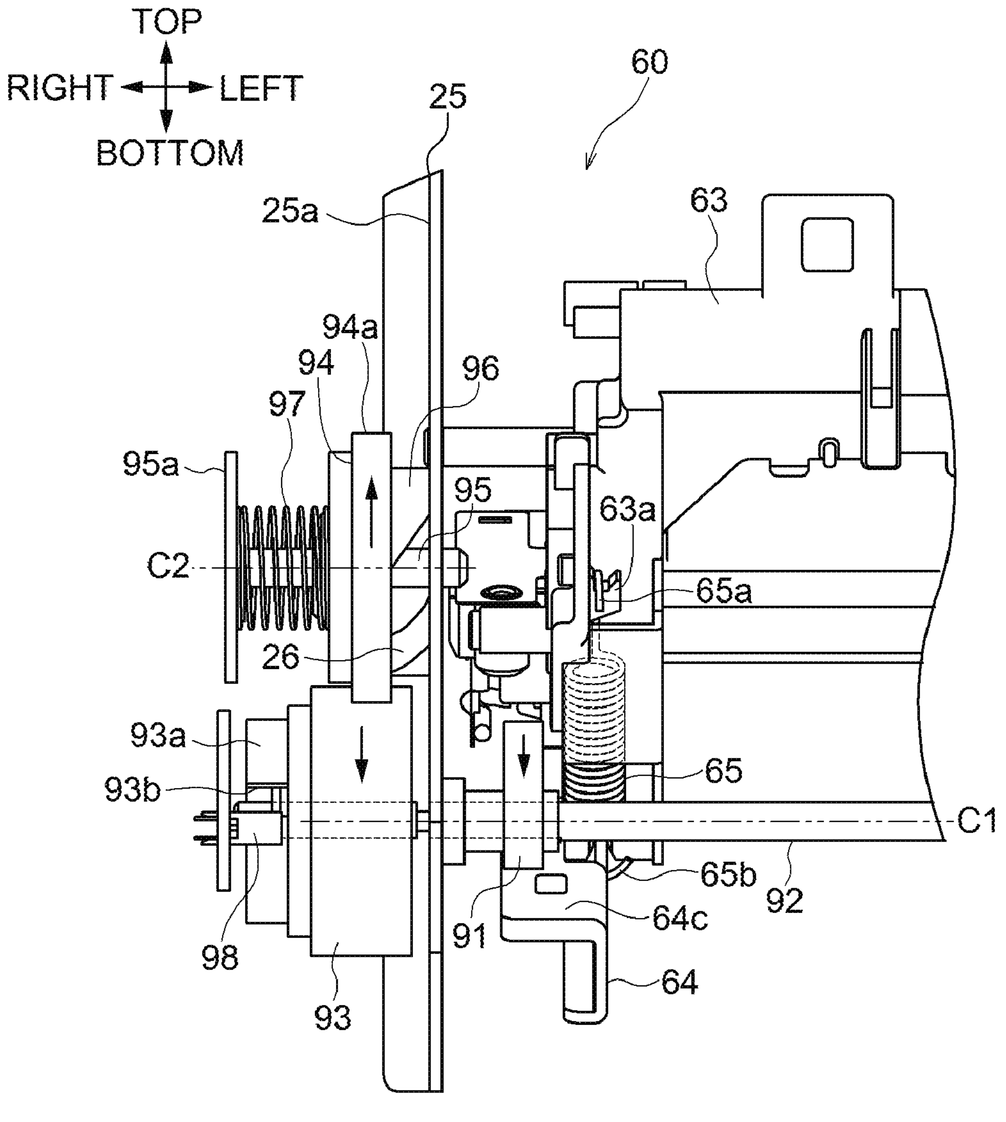
FIG. 3 is a rear view of the fuser.
Figure 4:
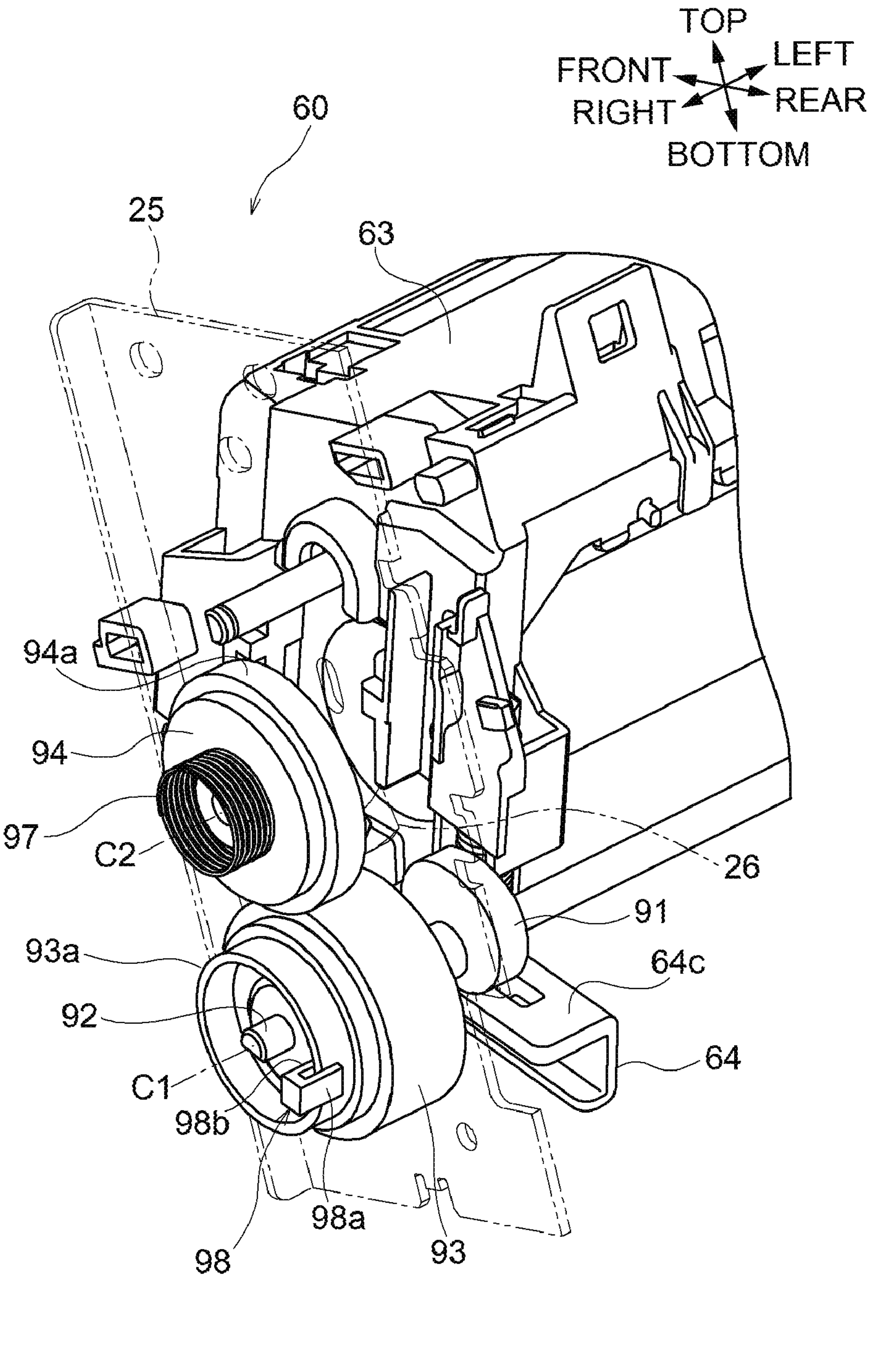
FIG. 4 is a perspective view of the fuser.

As depicted in FIGS. 2-4, the fuser 60 includes the heat roller 61, the pressure roller 62, a frame 63, a support member 64, a first spring 65, a first cam 91, a first shaft 92, a first gear 93, a second gear 94, a second shaft 95, a second cam 96, a second spring 97, and a third cam 26.

The frame 63 supports the heat roller 61 such that the roller 61 is rotatable. The frame 63 is fixedly supported by the casing 2. The support member 64 supports the pressure roller 62 such that the roller 62 is rotatable. The support member 64 is supported by the frame 63 such that the support member 64 is pivotable about a pivot center 64*a*.

Figure 7A:
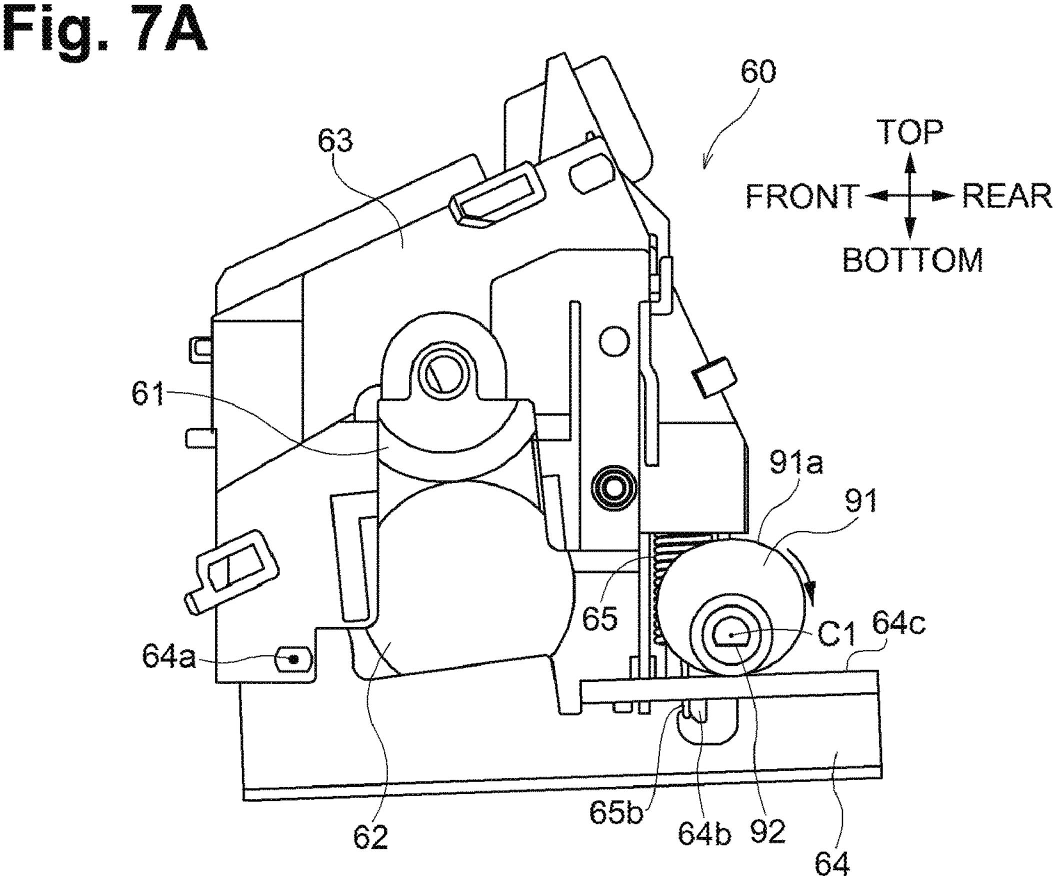
FIG. 7A is a side view of the fuser, illustrating that a pressure roller is at a nip position.
Figure 8A:
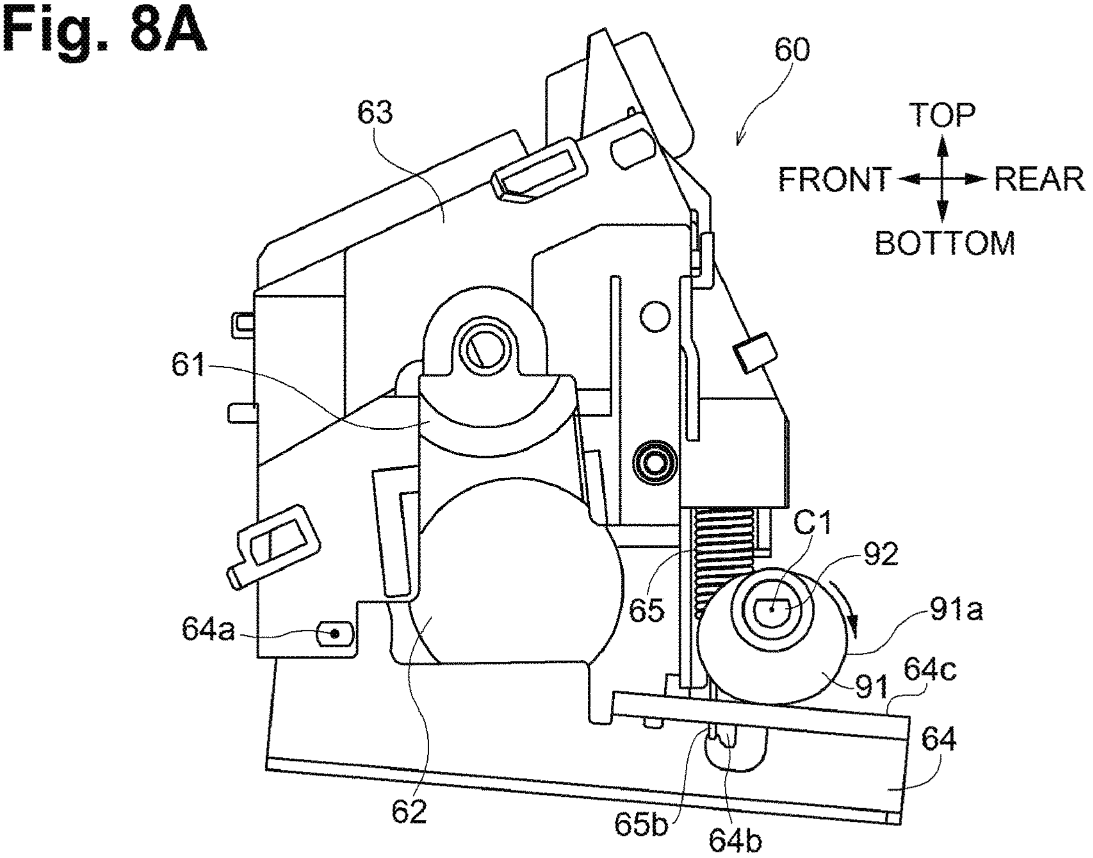
FIG. 8A is a side view of the fuser, illustrating that the pressure roller is at a separated position.

Pivoting the support member 64 about the pivot center 64*a* may cause the pressure roller 62 to move between a nip position (in FIG. 7A) and a separated position (in FIG. 8A). At the nip position, the pressure roller 62 is in pressed contact with the heat roller 61. At the separated position, the pressure roller 62 is separated from with the heat roller 61. In other words, the support member 64 supports the pressure roller 62 such that the roller 62 is movable between the nip position and the separated position.

As depicted in FIG. 3, the first spring 65 has a first end 65*a* and a second end 65*b* opposite to the first end 65*a*. The first end 65*a* engages an engagement portion 63*a* of the frame 63 while the second end 65*b* engages an engagement portion 64*b* (in FIG. 2) of the support member 64. The first spring 65 may be a tension spring. The first spring 65 is hooked to the engagement portions 63*a* and 64*b* and is extended between the engagement portions 63*a* and 64*b*.

The first spring 65 urges the support member 64 in a direction to pivot the support member 64 toward the frame 63. The first spring 65 also urges the pressure roller 62 toward the heat roller 61.

The first cam 91 has a disk shape and includes the first shaft 92, which is off-centered. The first cam 91 is rotatable about a first axis C1 of the first shaft 92.

The first cam 91 has a cam surface 91*a*, which is an outer peripheral surface of the first cam 91 as. The cam surface 91*a* contacts a contact portion 64*c* of the support member 64. Rotation of the first cam 91 about the first axis C1 while the cam surface 91*a* is in contact with the contact portion 64*c* may cause the pressure roller 62 to move between the nip position and the separated position.

The casing 2 includes a sideplate 25 that is elongated in the top-bottom direction. The sideplate 25 supports the first shaft 92 such that the first shaft 92 is rotatable. The first shaft 92 is configured to receive drive force from a drive source (e.g., a motor) of the image forming apparatus 1.

The drive force may cause the first cam 91 to rotate in a particular rotating direction (e.g., a forward direction). In the illustrative embodiment, the forward direction corresponds to the clockwise direction in FIG. 2, as indicated by an arrow.

The first gear 93 is fixed on the first shaft 92. The first gear 93 is configured to rotate about the first axis C1 together with the first cam 91. The first gear 93 has a particular number of gear teeth on an entire peripheral surface thereof.

The first gear 93 has a generally annular-shaped wall 93*a*. The wall 93*a* extends in a direction along the first axis C1 (e.g., toward "right" shown in FIG. 3) from a surface of the first gear 93. The wall 93*a* extends in a circumferential direction of the first gear 93 and surrounds an end portion of the first shaft 92. The wall 93*a* has a cut portion 93*b* (as depicted in FIG. 3) on a portion thereof.

The fuser 60 further includes a photosensor 98 configured to detect a phase of the first gear 93 in the rotating direction of the first gear 93. The photosensor 98 is an example of a "detector" as claimed.

The photosensor 98 includes a light emitter 98*a* and a light receiver 98*b*. The photosensor 98 is configured to detect the phase of the first gear 93 in its rotating direction, based on whether the light emitted from the light emitter 98*a* is received by the light receiver 98*b*.

The photosensor 98 is disposed such that the wall 93*a* is located between the light emitter 98*a* and the light receiver 98*b*.

During the rotation of the first gear 93, the cut portion 93*b* may be located between the light emitter 98*a* and the light receiver 98*b*. The cut portion 93*b* allows the light emitted from the light emitter 98*a* to pass therethrough, so that the light may be received by the light receiver 98*b*.

In contrast, when the wall 93*a* is located between the light emitter 98*a* and the light receiver 98*b*, the light emitted from the light emitter 98*a* is blocked by the wall 93*a*, so that the light may not be received by the light receiver 93*b*.

The photosensor 98 is configured to detect a phase of the first gear 93 in its rotating direction when the cut portion 93*b* is located between the light emitter 98*a* and the light receiver 98*b*, e.g., when the light receiver 98*b* has received the light emitted from the light emitter 98*a*.

Detecting the phase of the first gear 93 in its rotating direction may enable the phase of the first cam 91 in its rotating direction to be determined accurately, because the first gear 93 and the first cam 91 rotate together.

The second gear 94 is supported by the second shaft 95. The second shaft 95 is an example of "a shaft with an axis thereof aligned with the second axis C2" as claimed. The second shaft 95 is supported by the sideplate 25.

The second shaft 95 is disposed such that the second axis C2 is parallel to the first axis C1 of the first shaft 92. The second gear 94 is supported by the second shaft 95. The second gear 94 is rotatable about the second axis C2 and movable in a direction along the second axis C2.

The second gear 94 has gear teeth 94*a* on an entire peripheral surface thereof. The gear teeth 94*a* engage the gear teeth of the first gear 93. The second gear 94 has the same number of the gear teeth as the first gear 93.

The rotation of the first gear 93 may cause the second gear 94 to rotate in a direction opposite to the rotating direction of the first gear 93. In short, the rotating direction of the second gear 94 is the counterclockwise direction shown in FIG. 2.

The first gear 93 and the second gear 94 have the same number of the gear teeth, so that the gears 93 and 94 may rotate at the same speed.

The second shaft 95 has an end (e.g., a "right" end shown in FIG. 3) having a plate 95*a* fixed thereon and an opposite end supported by the sideplate 25. The plate 95*a* has a diameter larger than the second shaft 95. The second gear 94 is disposed between the sideplate 25 and the plate 95*a*.

The fuser 60 further includes a second spring 97 disposed between the second gear 94 and the plate 95*a* in a compressed state. The second spring 97 may be a compression coil spring. The second spring 97 has an axis (e.g., a center in the diametrical direction of the second spring 97) aligned with the second axis C2. The second spring 97 urges the second gear 94 in the direction along the second axis C2, e.g., toward the sideplate 25.

The second cam 96 is rotatable together with the second gear 94. The second cam 96 is configured to cause the second gear 94 to move in the direction along the second axis C2 against the urging force of the second spring 97.

The second cam 96 is disposed between the gear teeth 94*a* and the second shaft 95 in a radial direction of the second gear 94. The second cam 96 is located on a surface of the second gear 94 such that the second gear 94 is between the second cam 96 and the second spring 97. The second cam 96 extends from the surface of the second gear 94 toward the sideplate 25 in the direction along the second axis C2. At least a portion of the second cam 96 is disposed radially outside of the second spring 97 in the radial direction of the second gear 94. In other words, a diameter defined by a rotational pathway of a cam surface of the second cam 96 is greater than a diameter of a coil of the second spring 97.

Figure 5A:
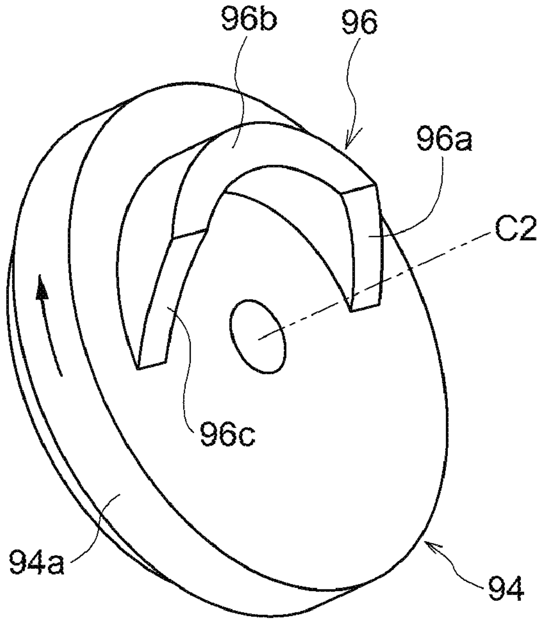
FIG. 5A is a perspective view of a second gear and a second cam of the fuser.
Figure 5B:
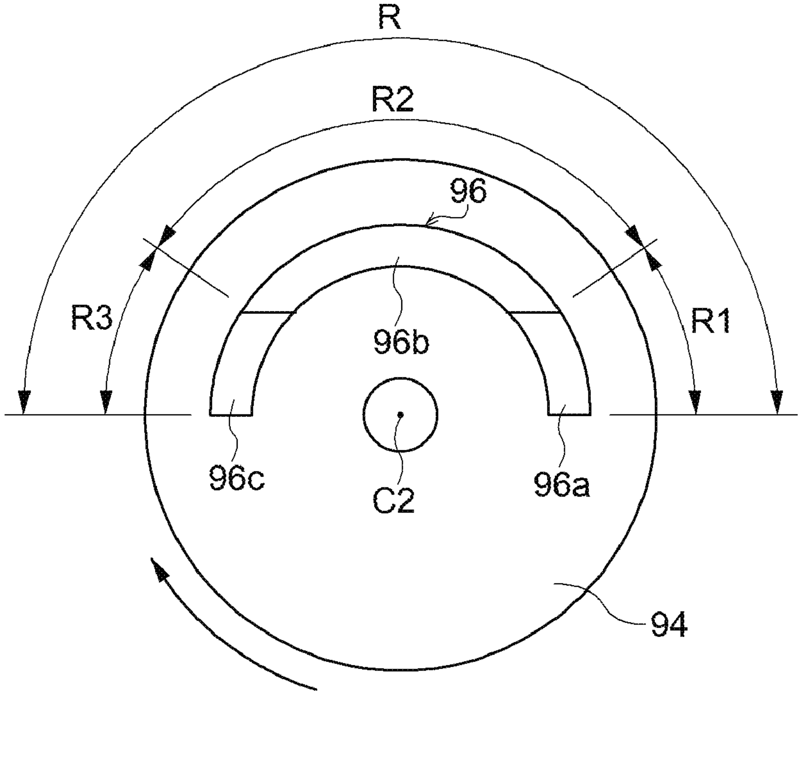
FIG. 5B is a side view of the second gear and the second cam.

As depicted in FIGS. 5A and 5B, the second cam 96 is provided in a particular range R in a circumferential direction of the second gear 94. The second cam 96 includes a first portion 96*a*, a second portion 96*b*, and a third portion 96*c*.

The first portion 96*a*, the second portion 96*b*, and the third portion 96*c* are arranged in this order from the downstream to the upstream in the rotating direction of the second gear 94.

The first portion 96*a* is provided in a range R1 in the circumferential direction of the second gear 94. The first portion 96*a* has a first surface (e.g., an inclined surface) that is inclined or angled relative to the direction along the second axis C2. Additionally, the first surface is inclined such that an upstream portion of the first surface in the rotating direction of the second gear 94 extends farther away from the second gear 94.

The second portion 96*b* is provided in a range R2 in the circumferential direction of the second gear 94. The second portion 96*b* has a second surface that may be flat and parallel to a direction perpendicular to the direction along the second axis C2.

The third portion 96*c* is provided in a range R3 in the circumferential direction of the second gear 94. The third portion 96*c* has a third surface that is inclined or angled relative to the direction along the second axis C2. Additionally, the third surface is inclined such that an upstream portion of the third surface in the rotating direction of the second gear 94 extends farther toward the second gear 94.

The range R is equal to the sum of the ranges R1, R2, and R3.

Figure 6:
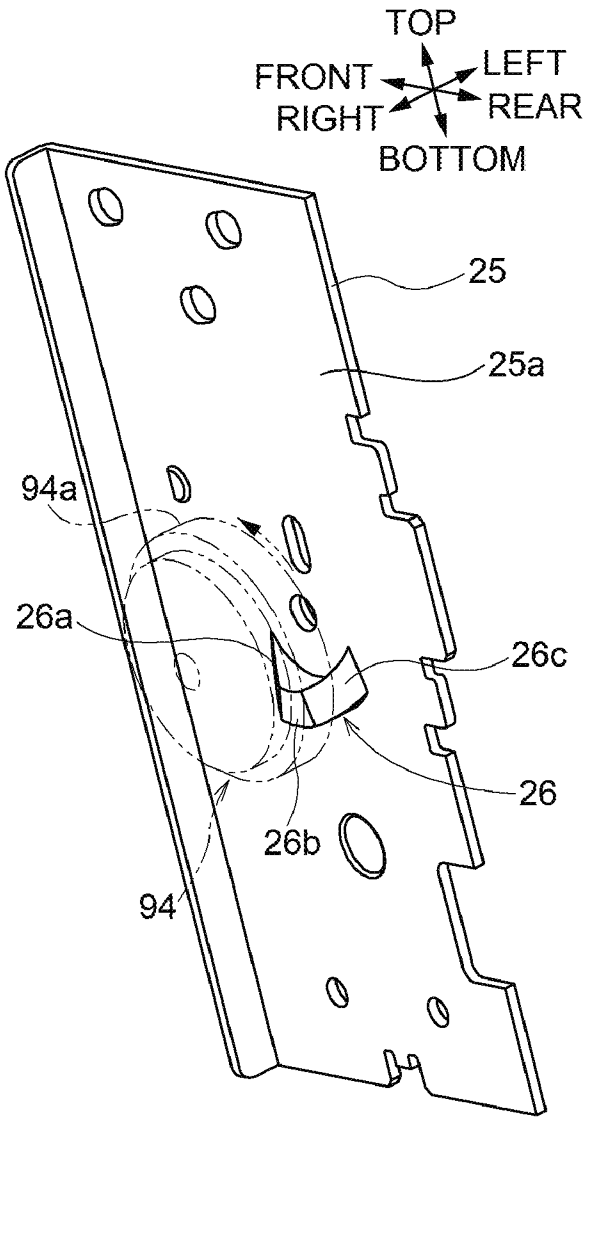
FIG. 6 is a perspective view of a side plate and a third cam of the fuser.

The second cam 96, the second gear 94, and the second spring 97 are arranged in this order from "left" to "right" (e.g., in the direction along the second axis C2) as depicted in FIGS. 3 and 6. In other words, the second cam 96 is located on one surface of the second gear 94 and the second spring 97 is located on the other surface of the second gear 94 in the direction along the second axis C2.

As depicted in FIGS. 3 and 6, the third cam 26 is formed on and extends from a surface 25*a* of the sideplate 25 toward the second gear 94.

The third cam 26 is disposed facing the second cam 96. The third cam 26 is configured to slidably contact the second cam 96 while the second gear 94 is at a particular rotational phase in the rotating direction of the second gear 94. The second cam 96 contacts the surface 25*a* of the sideplate 25 while the second cam 96 does not contact the third cam 26.

The third cam 26 extends along the circumferential direction of the second gear 94. The third cam 26 includes a first cam surface 26*a*, a second cam surface 26*b*, and a third cam surface 26*c*. The first cam surface 26*a*, the second cam surface 26*b*, and the third cam surface 26*c* are continuously arranged in this order from the upstream to the downstream in the rotating direction of the second gear 94.

The first cam surface 26*a* is inclined or angled relative to the direction along the second axis C2. Additionally, the first cam surface 26*a* is inclined such that a downstream portion of the first cam surface 26*a* in the rotating direction of the second gear 94 extends farther away from the sideplate 25. The second cam surface 26*b* is parallel to a direction perpendicular to the direction along the second axis C2. The third cam surface 26*c* is inclined or angled relative to the direction along the second axis C2. Additionally, the third cam surface 26*c* is inclined such that a downstream portion of the third cam surface 26*c* in the rotating direction of the second gear 94 extends farther toward the sideplate 25.

[Operations of Fuser]

Operations of the fuser 60 will now be described.

Figure 7B:
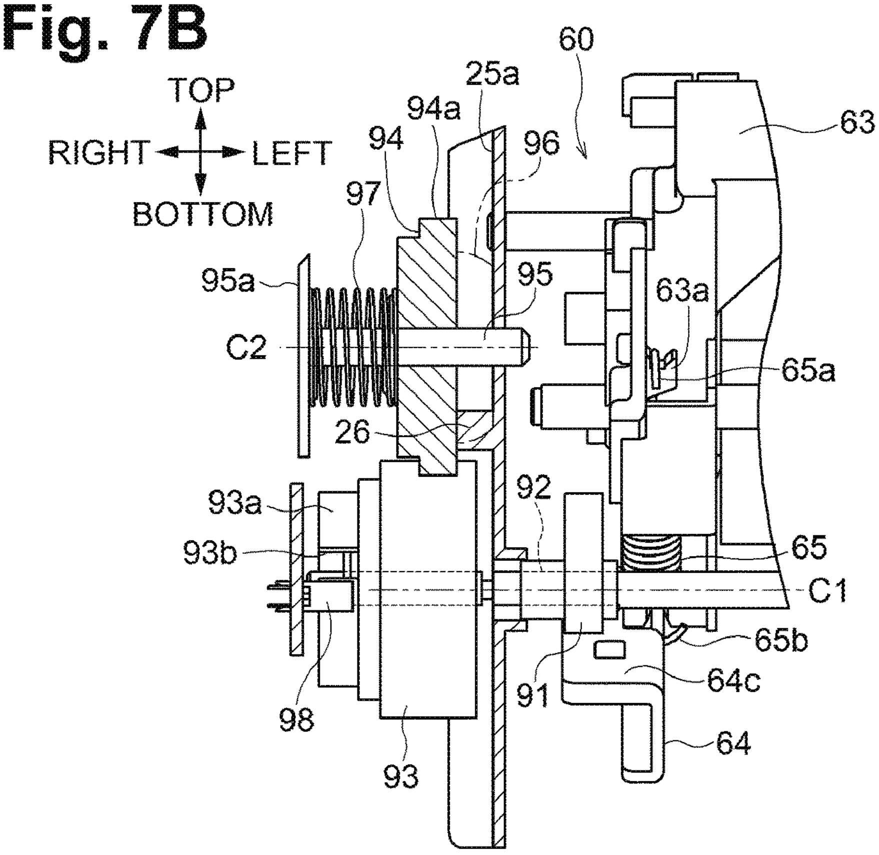
FIG. 7B is a rear view of the fuser, illustrating that the pressure roller is at the nip position.

As depicted in FIGS. 7A and 7B, the pressure roller 62 of the fuser 60 is located at the nip position when a particular portion of the cam surface 91*a* of the first cam 91 contacts the contact portion 64*c* of the support member 64. The particular portion of the first cam surface 91*a* has the shortest distance from the first axis C1.

When the pressure roller 62 is at the nip position, the drive force from the drive source may cause the first cam 91 to rotate in its rotating direction (e.g., the forward direction). The rotation of the first cam 91 may cause another portion of the cam surface 91*a* to contact the contact portion 64*c*. The another portion of the cam surface 91*a* has a longer, but not the longest, distance from the first axis C1 than the particular portion of the first cam 91. In other words, the distance from the first axis C1 to a position of the cam surface 91*a* contacting the contact portion 64*c* increases, in association with the rotation of the first cam 91, as the pressure roller 62 moves from the nip position toward the separated position. Thus, the first cam 91 presses the support member 64, against the urging force of the first spring 65, and then the support member 64 pivotally moves away from the frame 63.

Figure 8B:
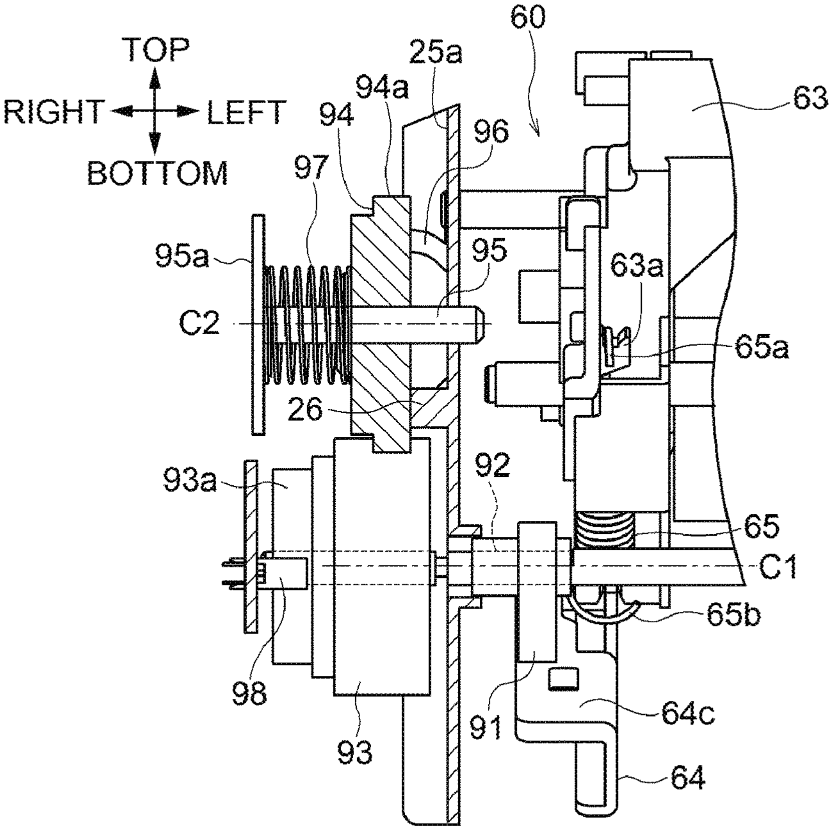
FIG. 8B is a rear view of the fuser, illustrating that the pressure roller is at the separated position.

Pivoting movement of the support member 64 in a direction away from the frame 63 may cause the pressure roller 62 to move away from the heat roller 61. Rotation of the first cam 91 by 180 degrees from a position where the pressure roller 62 is at the nip position may cause the other portion of the first cam surface 91*a* to contact the contact portion 64*c*, thereby causing the pressure roller 62 to move to the separated position, as depicted in FIGS. 8A and 8B. The other portion of the cam surface 91*a* has the longest distance from the first axis C1.

Figure 9A:
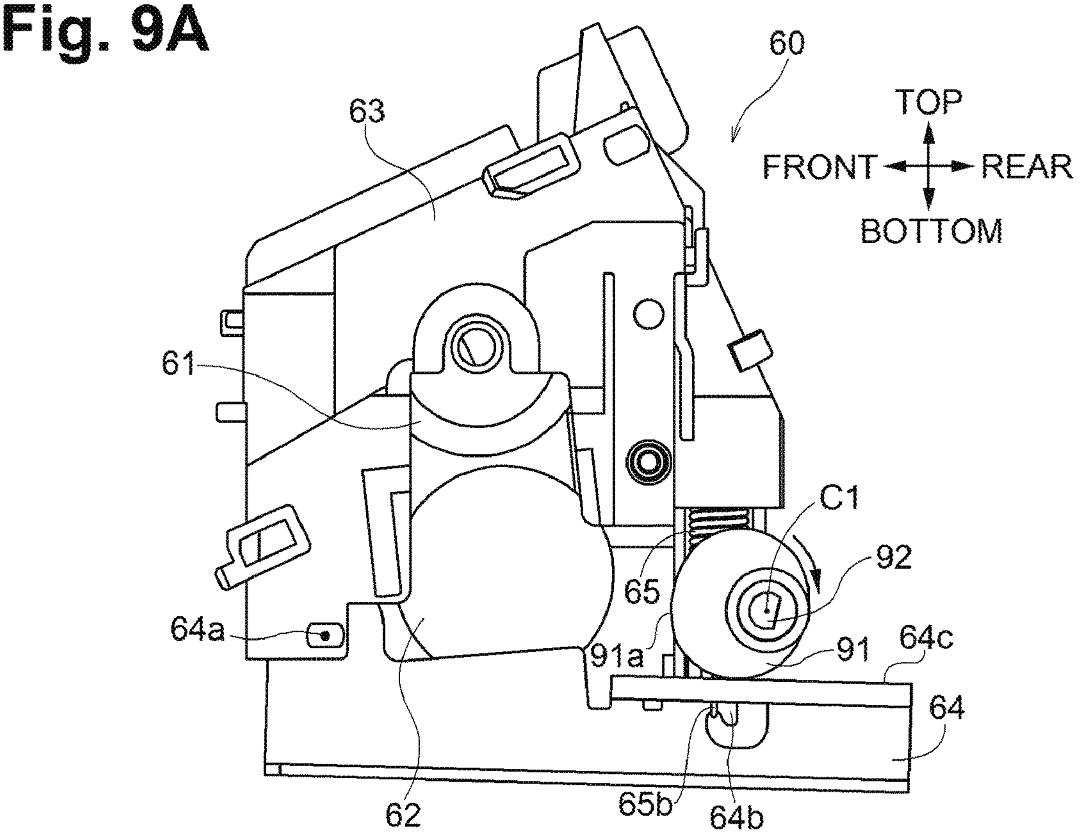
FIG. 9A is a side view of the fuser, illustrating that the pressure roller moves from the separated position toward the nip position.

Further rotation of the first cam 91 from a position where the pressure roller 62 is at the separated position may cause the another portion of the cam surface 91*a* to contact the contact portion 64*c*. In other words, the distance from the first axis C1 to a portion of the cam surface 91*a* contacting the contact portion 64*c* decreases in association with the rotation of the first cam 91, as the pressure roller 62 moves from the separated position toward the nip position. This may cause the pressure roller 62 to move from the separated position toward the nip position due to the urging force of the first spring 65, as depicted in FIG. 9A.

Further rotation of the first cam 91 by 180 degrees from a position where the pressure roller 62 is at the separated position may cause the particular portion of the first cam surface 91*a* to contact the contact portion 64*c*, thereby causing the pressure roller 62 to move back to the nip position.

The first cam 91 has such a cam profile that, rotation of the first cam 91 from a position where the pressure roller 62 is at the nip position causes the support member 64 to move away from the frame 63 against the urging force of the first spring 65, and rotation of the first cam 91 from a position where the pressure roller 62 is at the separated position causes the support member 64 to move toward the frame 63 due to the urging force of the first spring 65.

Figure 10:
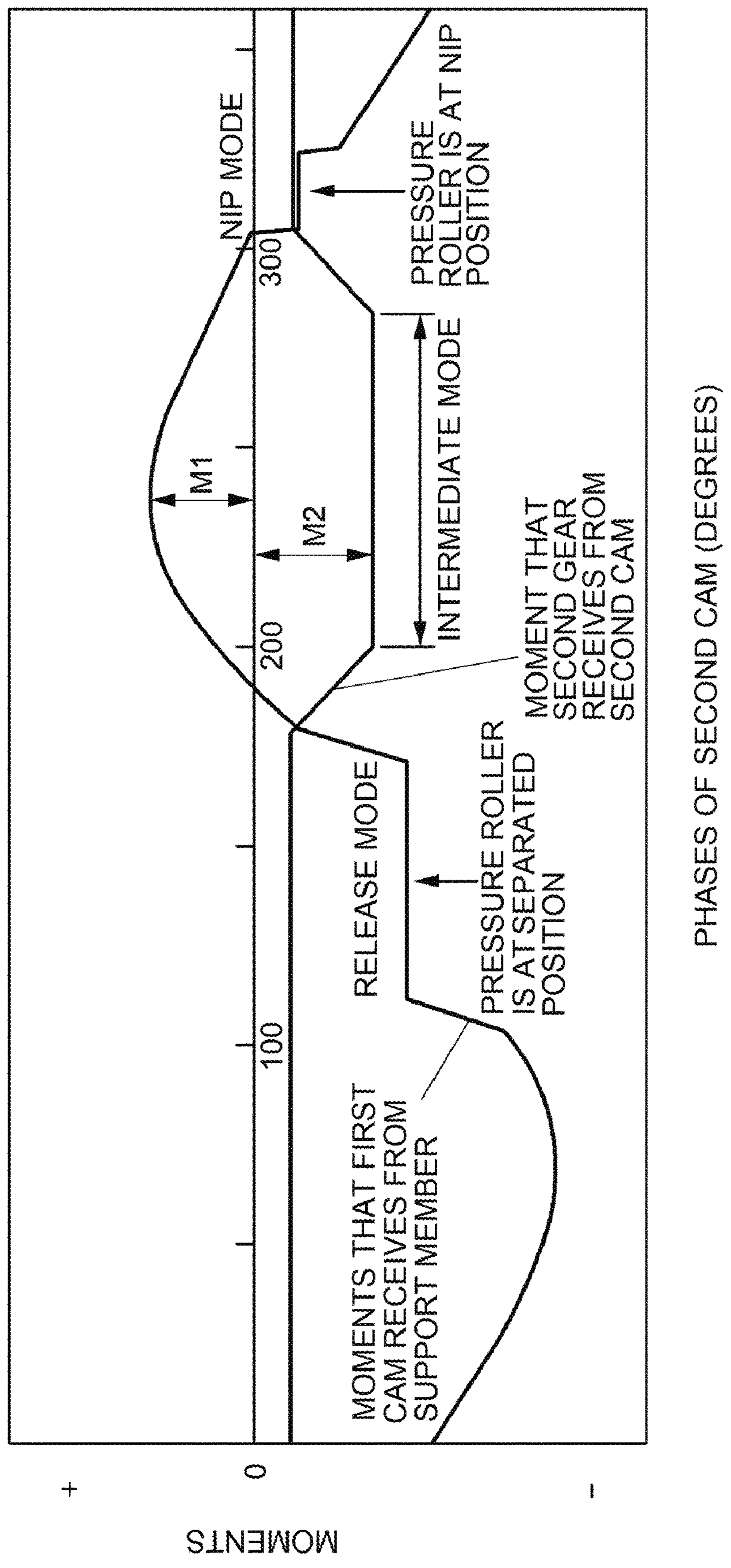
FIG. 10 is a diagram illustrating a relationship between moments and phases of the second cam, wherein the diagram illustrates moments that the first cam receives from a support member of the fuser and moments that the second gear receives from the second cam.

As depicted in FIG. 10, the fuser 60 has three modes: a nip mode; a release mode; and an intermediate mode. The nip mode allows the fuser 60 to thermally fix a toner image onto a relatively thin sheet S, such as a plain paper sheet. The release mode allows a sheet S jammed in the fuser 60 to be removed. The intermediate mode allows the fuser 60 to thermally fix a toner image on a relatively thick sheet S, such as an envelope.

In the nip mode, the pressure roller 62 is at the nip position. In the release mode, the pressure roller 62 is at the separated position. In the intermediate mode, the pressure roller 62 is located at a particular position between the separated position and the nip position.

The contact portion 64*c* of the support member 64 is pressed against the first cam 91 due to the urging force of the first spring 65. When the first cam 91 rotates with the drive force from the drive source, the first cam 91 may receive moments from the support member 64. Such moments that the first cam 91 receives from the support member 64 will now be described in more detail with reference to FIG. 10.

The first cam 91 starts rotating when the pressure roller 62 is at the nip position, and then continues rotating until the pressure roller 62 reaches the separated position. During the rotation of the first cam 91, the support member 64 applies braking moments to the first cam 91. The barking moments may brake or slow the rotation of the first cam 91. While the first cam 91 further rotates to move the pressure roller 62 from the separated position toward the nip position, e.g., while the fuser 60 transitions from the release mode to the intermediate mode, the first cam 91 receives urging moments from the support member 64. The urging moments may urge the rotation of the first cam 91 in its rotating direction, which is the forward direction in which the first cam 91 rotates with the drive force from the drive source.

In the diagram shown in FIG. 10, negative values (i.e., values below zero) show braking moments that brakes or slows the rotation of the first cam 91 in its rotating direction, and positive values (i.e., values above zero) show urging moments that urge the rotation of the first cam 91 in its rotating direction.

In the fuser 60, the first gear 93 rotates together with the first cam 91 as the first cam 91 rotates. The second gear 94 also rotates as the second gear 94 engages the rotating first gear 93. The rotation of the second gear 94 causes the second cam 96 to rotate together with the second gear 94.

The rotating second cam 96 may slidably contact the surface 25*a* of the sideplate 25 while the pressure roller 62 moves from the nip position to the separated position. When the second cam 96 is in contact with the surface 25*a*, the second gear 94 is located at a first position in the direction along the second axis C2.

When the second gear 94 is located at the first position, the second cam 96 is urged by the second spring 97 in the direction along the second axis C2 toward the sideplate 25. This may cause a frictional force between the second cam 96 and the sideplate 25. Due to the frictional force between the second cam 96 and the sideplate 25, the rotating second gear 94 may receive the barking moments from the second cam 96. The first gear 93 may also receive the braking moments indirectly via the second gear 94, which engages with the first gear 93.

Figure 9B:
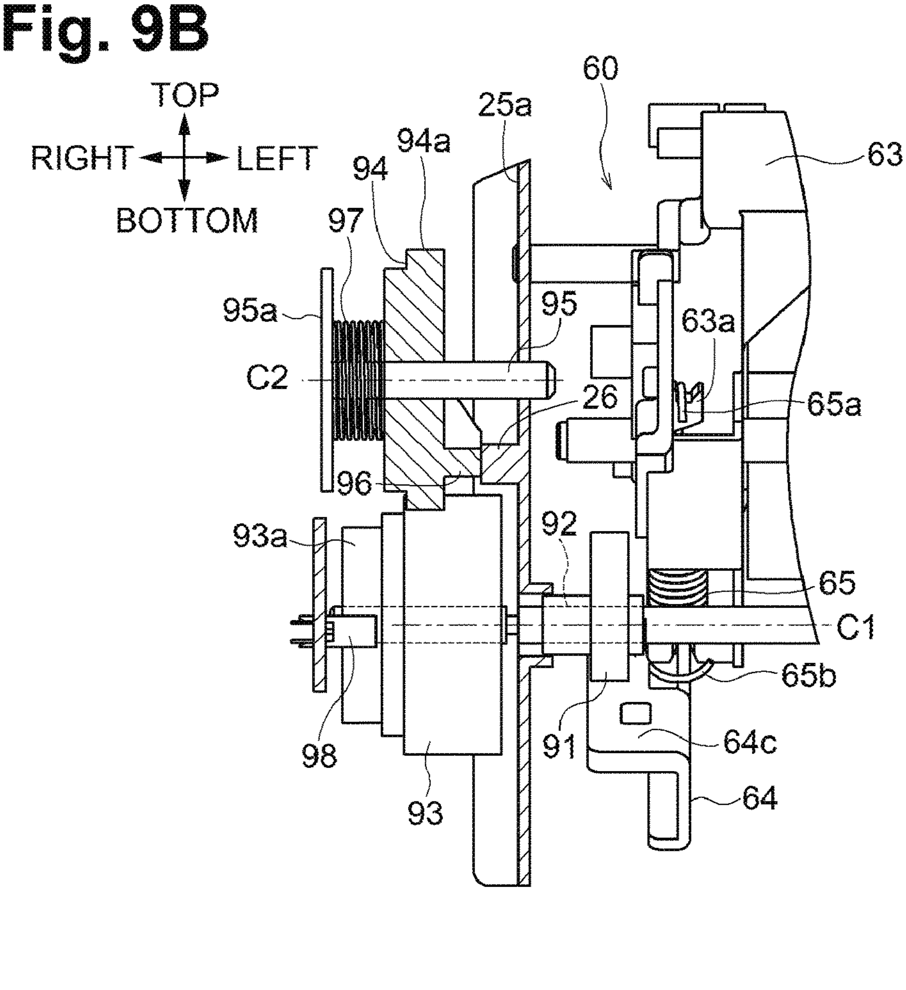
FIG. 9B is a rear view of the fuser, illustrating that the pressure roller moves from the separated position toward the nip position.

The rotating second cam 96 may slidably contact the third cam 26 at a particular phase in the rotating direction of the second cam 96 during the movement of the pressure roller 62 from the separated position to the nip position. As the second cam 96 contacts the third cam 26, the second gear 94 may be moved to a second position in a direction along the second axis C2, against the urging force of the second spring 97, as depicted in FIG. 9B. In other words, the second gear 94 may be moved in a direction such that the second spring 97 is more compressed. The second gear 94 located at the second position is closer to the plate 95*a* than the second gear 94 located at the first position.

Totally, the second gear 94 is movable between the first position and the second position in the direction along the first axis C2. When the second cam 96 is in contact with the surface 25*a* of the sideplate 25, the second gear 94 is located at the first position. When the second cam 96 is in contact with the third cam 26, the second gear 94 is located at the second position.

The second cam 96 has such a cam profile that, movement of the pressure roller 62 from the separated position to the nip position causes the second gear 94 to move from the first position to the second position in the direction along the second axis C2, against the urging force of the second spring 97, such that the second spring 97 is more compressed.

The second cam 96 is urged by the second spring 97 toward and against the third cam 26, thereby causing a frictional force between the second cam 96 and the third cam 26. Due to the frictional force between the second cam 96 and the third cam 26, the rotating second gear 94 may receive the braking moments from the second cam 96. The first gear 93 also receives the braking moments indirectly via the second gear 94, which engages with the first gear 93.

The urging force of the second spring 97 when the second cam 96 is in contact with the third cam 26, is greater than the urging force of the second spring 97 when the second cam 96 is in contact with the sideplate 25. This may result in a greater frictional force exerted between the second cam 96 and the third cam 26 than the frictional force exerted between the second cam 96 and the surface 25*a* of the sideplate 25.

Accordingly, the second gear 94 may receive greater braking moments when the second gear 94 is at the second position and the second cam 96 is in contact with the third cam 26, than when the second gear 94 is at the first position and the second cam 96 is in contact with the surface 25*a* of the sideplate 25.

With the aid of the second cam 96, the third cam 26, and the second spring 97, the second gear 94 is located at the first position while the pressure roller 62 is moving from the nip position to the separated position. The second gear 94 is located at the second position while the pressure roller 62 is moving from the separated position to the nip position. The braking moments that the second gear 94 receives may be variable by moving the second gear 94 between the first position and the second position, while the pressure roller 62 is moving back and forth between the nip position and the separated position.

While the rotation of the first cam 91 causes the pressure roller 62 to move from the nip position to the separated position, the rotating first cam 91 may receive braking moments, which brakes or slows or resists the rotation of the first cam 91, from both the support member 64 and the second cam 96.

The first cam 91 may receive braking moments mostly from the support member 64. The braking moments from the second cam 96 is significantly minor.

While the rotation of the first cam 91 causes the pressure roller 62 to move from the separated position to the nip position, the first cam 91 may receive urging moments, from the support member 64, that advances the rotation of the first cam 91, as well as the braking moments from the second cam 96.

The urging moments from the support member 64 may be reduced by the braking moments from the second cam 96. The braking moments that the first cam 91 receives from the second cam 96, while the pressure roller 62 moves from the separated position to the nip position, may be great enough to reduce the urging moments from the support member 64.

While the pressure roller 62 moves from the separated position to the nip position, the first cam 91 may receive the urging moments that advances the rotation of the first cam 91 in the forward direction, due to the urging force of the second spring 97. This may cause forward slip, so that the first cam 91 may rotate in the forward direction at a higher speed than the first cam 91 rotates with the drive force from the drive source. Such forward slip of the first cam 91 may cause noises due to backlash between the mating teeth of the rotating gears 93 and 94.

The fuser 60 of this embodiment is configured such that the urging moments that the first cam 91 receives from the support member 64 is reduced due to the braking moments that the first cam 91 receives from the second cam 96. Such braking moments may be expected by moving the second cam 96 from the first position to the second position during the movement of the pressure roller 62 from the separated position to the nip position. This configuration may result in slow rotation of the first cam 91 and less forward slip of the first cam 91, thereby reducing noises attributable to the forward slip of the first cam 91.

Cooperation of the second cam 96 with the third cam 26 may move the second gear 94 between the first position and the second position in the direction along the first axis C2. The frictional force between the third cam 26 and the second cam 96 may slow the rotation of the first cam 91 in its rotating direction.

In some embodiments, the third cam 26, which extends from the surface 25*a* of the sideplate 25 and is configured to contact the second cam 96, may be configured as a recessed portion that is recessed into the surface 25*a* of the sideplate 25, instead of extending from the surface 25*a*.

A person skilled in the art may determine desirable urging force of the second spring 97 and desirable position and shape of the second cam 96 to obtain proper frictional force between the second cam 96 and the third cam 26. For example, the urging force of the second spring 97 and the position and the shape of the second cam 96 may be determined such that a value M2 (in FIG. 10) of the braking moment that the second gear 94 receives from the second cam 96 is approximately equal to or greater than a value M1 of the urging moment that the first cam 91 receives during the movement of the pressure roller 62 from the separated position to the nip position. This configuration may further prevent or reduce the noises attributable to the forward slip of the first cam 91.

The first gear 93 has gear teeth on its entire peripheral surface and the second gear 94 has gear teeth on its entire peripheral surface. The number of the gear teeth 94*a* of the second gear 94 is equal to the number of the gear teeth of the first gear 93. This may allow the first gear 93 to be at the same rotating phases as the second gear 94, so that braking force may be applied at an appropriate timing to the first cam 91 that rotates together with the first gear 93. The braking force may prevent or reduce the forward slip of the first cam 91.

In addition, gear teeth of the first gear 93 always engage with gear teeth of the second gear 94. Because none of the first gear 93 and the second gear 94 has a missing gear section, a particular tooth of the first gear 93 may not receive entire load of the second gear 94.

The fuser 60 includes a braking mechanism configured to brake the first cam 91, thereby preventing or reducing the forward slip of the first cam 91. The braking mechanism includes components, such as the first gear 93, the second gear 94, the second cam 96, and the second spring 97. The sideplate 25, the second cam 96, the second gear 94, and the second spring 97 are arranged in this order in the direction along the second axis C2.

The second spring 97 may be a tension spring, instead of the compression coil spring. The tension spring of the second spring 97, and the second gear 94 may be disposed on the same side of the second gear 94. However, arrangements of the second cam 96, the second gear 94, and the compression spring of the second spring 97, as in the illustrative embodiment, such that the second cam 96 is disposed on one surface of the second gear 94 and the second spring 97 is disposed on the other surface of the second gear 94 may facilitate configuration of the fuser 60.

If a portion of the second cam 96 sticks out from the gear teeth 94*a* of the second gear 94 in its radial direction, the braking mechanism for the first cam 91 may be larger. In the illustrative embodiment, the second cam 96 is disposed between the gear teeth 94*a* and the second shaft 95 in the radial direction of the second gear 94. This configuration may help the braking mechanism be shaped to fit in a particular space.

The second cam 96 may be modified to change the braking forces applied to the first cam 91. For example, a contacting area of the second cam 96 with the third cam 26 may be modified by changing a diameter of the second cam 96 to adjust the braking forces. Or, the second cam 96 in the radial direction of the second gear 94 may be disposed at another position to adjust the braking forces.

Figure 11A:
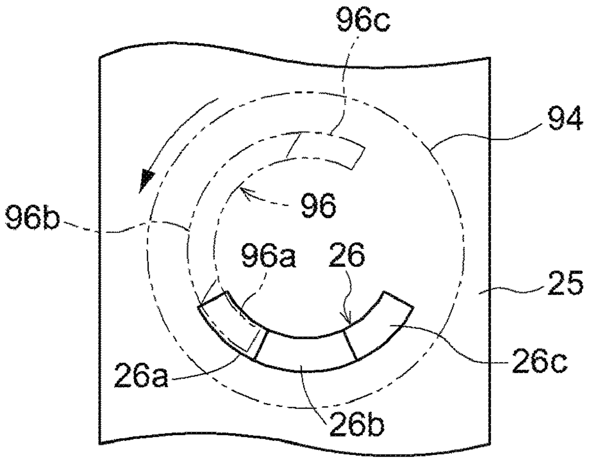
FIGS. 11A-11C illustrates how the second cam contacts a third cam of the fuser in association with a rotation of the second gear.

When the rotation of the second gear 94 located at the first position causes the second cam 96 to rotate and contact the third cam 26, the first portion 96*a* of the second cam 96 may first contact the first cam surface 26*a* of the third cam 26, as depicted in FIG. 11A. The second cam 96 may further rotate while the first portion 96*a* and the first cam surface 26*a* are in contact with each other. This may cause the second gear 94 to gradually move from the first position toward the second position.

Figure 11B:
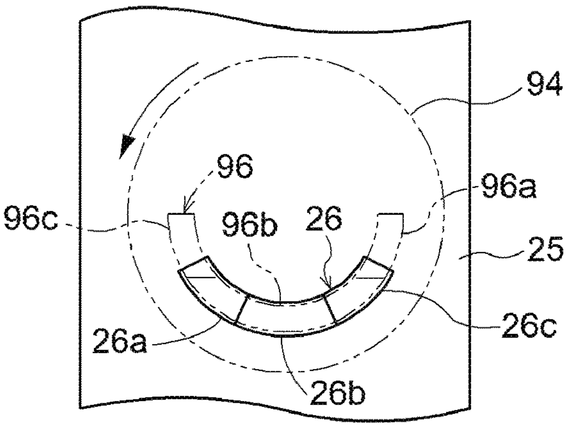

As the second cam 96 further rotate while the first portion 96*a* and the first cam surface 26*a* are in contact with each other, the second portion 96*b* of the second cam 96 comes into contact with the second cam surface 26*b* of the third cam 26, as depicted in FIG. 11B. When the second portion 96*b* is in contact with the second cam surface 26*b*, the second gear 94 is at the second position. The frictional force between the second cam 96 and the third cam 26 may cause the first cam 91 to reduce its rotational speed.

When the first portion 96*a* of the second cam 96 is in contact with the first cam surface 26*a* of the third cam 26, the first portion 96*a* causes the second gear 94 to gradually move from the first position toward the second position in association with the rotation of the second gear 94. Angles of the inclined surface of the first portion 96*a* may be determined to achieve proper braking applied by the second cam 96.

When the second gear 94 is in the second position, the second portion 96*b* is in contact with the second cam surface 26*b*. Such state may continue as long as the second gear 94 is in a particular range of rotational phase. This configuration may allow the second gear 94 to be held at the second position for a certain time frame corresponding to the particular range of rotational phase and may stably apply braking force to the first cam 91. In addition, the second gear 94 moved to the second position may not tilt relative to the direction along the second axis C2.

Figure 11C:
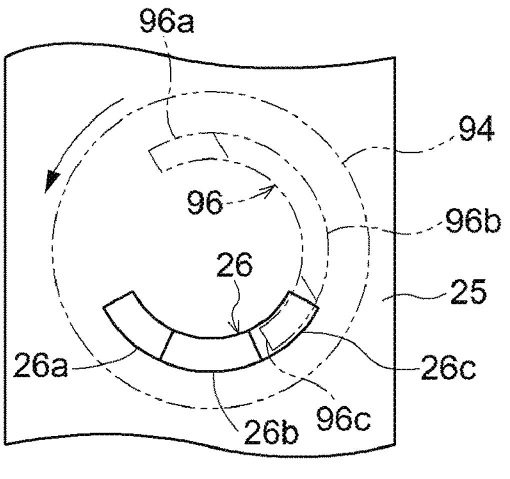

As the second cam 96 further rotates with the second portion 96*b* contacting the second cam surface 26*b*, the third portion 96*c* of the second cam 96 comes into contact with the third cam surface 26*c* of the third cam 26, as depicted in FIG. 11C. As the second cam 96 further rotates with the third portion 96*c* contacting the third cam surface 26*c*, the second gear 94 gradually moves from the second position to the first position.

As the second cam 96 further rotates, the third portion 96*c* is out of contact with the third cam surface 26*c*. This may cause the second cam 96 to contact the surface 25*a* of the sideplate 25 and the second gear 94 to be located at the first position.

Second Illustrative Embodiment of Fuser

A fuser 160 according to a second illustrative embodiment will now be described.

Figure 12:
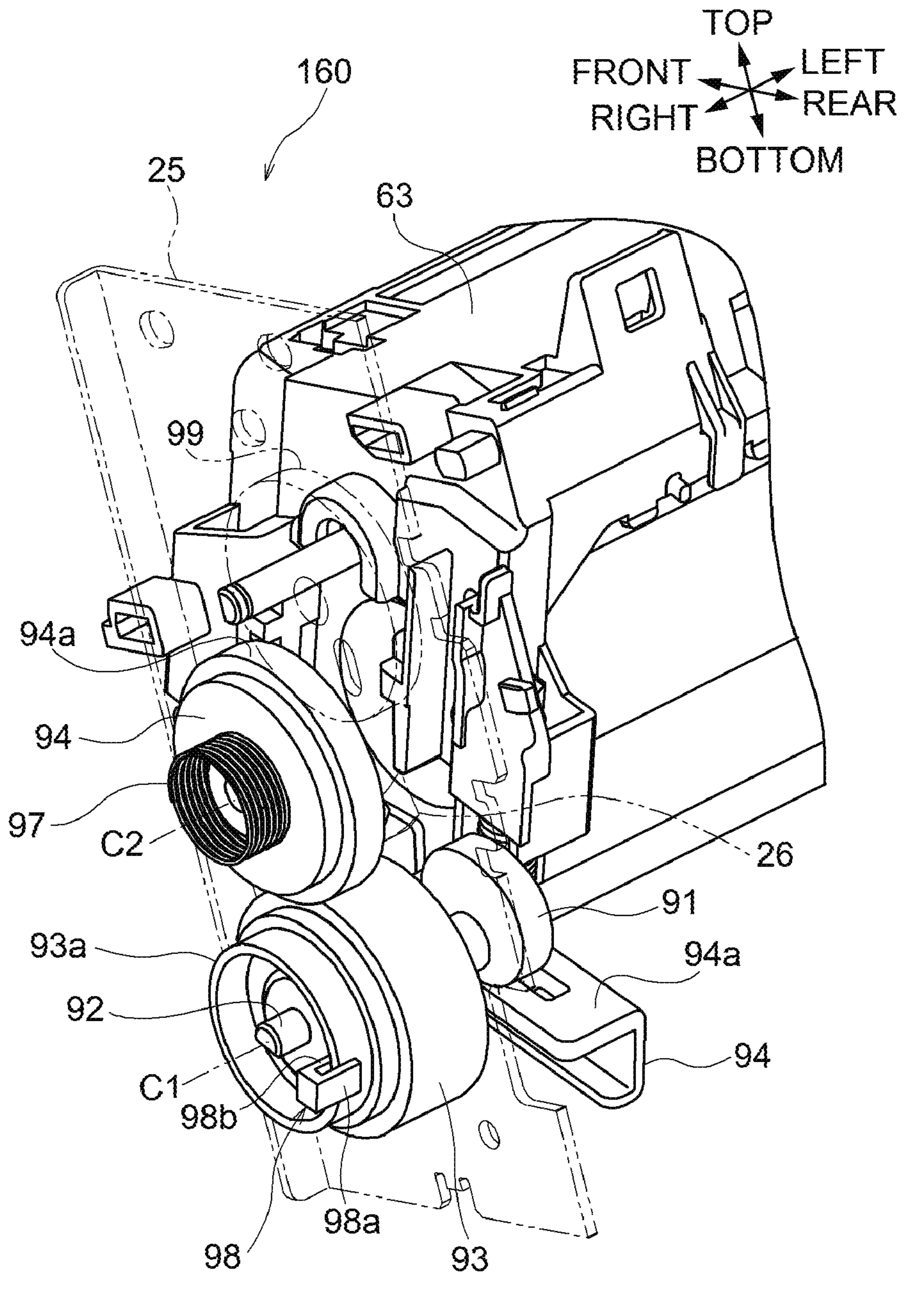
FIG. 12 is a perspective view of a fuser in a second illustrative embodiment according to one or more aspects of the disclosure.

As depicted in FIG. 12, the fuser 160 includes a third gear 99 configured to receive drive force from the drive source. The drive force received by the third gear 99 may eventually cause the first cam 91 to rotate, unlike the first illustrative embodiment in which the drive force from the drive source is received by the first shaft 92 to rotate the first cam 91. The remainder of the fuser 160 is configured substantially as described above in conjunction with the fuser 60.

The third gear 99 is engaged with the second gear 94. The drive force received by the third gear 99 is transmitted to the second gear 94. The drive force transmitted to the second gear 94 is then transmitted to the first cam 91 via the first gear 93 and the first shaft 92. The drive force may cause the first cam 91 to rotate in its rotating direction (e.g., forward direction).

The fuser 160 includes a drive force transmission configured to transmit drive force to the first cam 91. The drive force transmission includes the third cam 99, the second gear 94, the first gear 93, the first shaft 92, and the first cam 91. The second gear 94 is used for both the drive force transmission and the braking mechanism.

This configuration may reduce the number of gears to be used for the fuser 160, thereby simplifying the configuration of the fuser 160.

[Technical Improvement of Illustrative Embodiment]

The electrophotographic image forming apparatus 1 includes the fuser 60. The fuser 60 includes the heat roller 61, the pressure roller 62, the support member 64, the first spring 65, the first cam 91, the first gear 93, the second gear 94, the second spring 97, and the second cam 96.

The heat roller 61 is configured to apply heat to the sheet S. The pressure roller 62 is disposed facing the heat roller 61. The support member 64 supports the pressure roller 62 to allow the pressure roller 62 to move between the nip position and the separated position. The first spring 65 urges the pressure roller 62 toward the heat roller 61. The first cam 91 may rotate in contact with the support member 64, thereby causing the pressure roller 62 to move between the nip position and the separated position. The first gear 93 is configured to rotate about the first axis C1, together with the first cam 91. The first gear 93 has a particular number of gear teeth. The second gear 94 has gear teeth 94*a* that engage the gear teeth of the first gear 93. The number of the gear teeth 94*a* is the same as the number of the gear teeth of the first gear 93. The second gear 94 is configured to rotate about the second axis C2 and to move in the direction along the second axis C2. The second spring 97 urges the second gear 94 in the direction along the second axis C2. The second cam 96 is integrally formed with the second gear 94 and is configured to rotate together with the second gear 94. The second cam 96 is configured to move the second gear 94 in the direction along the second axis C2 against the urging force of the second spring 97.

The second cam 96 has such a cam profile that causes the second gear 94 to move in the direction along the second axis C2 as the pressure roller 62 moves from the separated position to the nip position, thereby increasing the urging force of the second spring 97 against its urging force.

This configuration may reduce the urging moments acting on the first cam 91, and slow or brake the rotation of the first cam 91. Consequently, noises attributable to the forward slip of the first cam 91 due to the urging moments may be prevented or reduced.

The number of the gear teeth 94*a* of the second gear 94 is the same as the number of the gear teeth of the first gear 93. This may allow the first gear 93 to be at the same rotating phases as the second gear 94, so that braking force may be applied at an appropriate timing to the first cam 91, to prevent or reduce the forward slip of the first cam 91.

In addition, full gears, e.g., the first gear 93 and the second gear 94, are constantly engaged with each other. This configuration may prevent or reduce a particular tooth of a gear from being applied with a greater load, which may occur when a missing gear section of a partial gear first engages with a full gear.

The second cam 96, the second gear 94, and the second spring 97 are arranged such that the second cam 96 is located on one surface of the second gear 94 and the second spring 97 is located on the other surface of the second gear 94 in the direction along the second axis C2.

Such arrangements of the second cam 96, the second gear 94, and the second spring 97, e.g., a compression spring, may facilitate configuration of the braking mechanism for the first cam 91.

The second gear 94 is supported by the second shaft 95 having the second axis C2. The second gear 94 has gear teeth 94*a* on a peripheral surface thereof. The second cam 96 is disposed between the gear teeth 94*a* and the second shaft 95 in the radial direction of the second gear 94. The second cam 96 extends from the second gear 94 in the direction along the second axis C2 (e.g., toward the side plate 25).

This configuration may prevent or reduce the braking mechanism from increasing its size.

The second spring 97 is, for example, a compression coil spring with its center aligned with the second axis C2. A portion of the second cam 96 is located outside of the second spring 97 in the radial direction of the second gear 94.

This configuration may increase the braking force of the second cam 96.

The fuser 60 of the image forming apparatus 1 includes the third cam 26 disposed facing the second cam 96 and configured to contact the second cam 96.

This configuration may allow the second gear 94 to move from the first position to the second position in the direction along the second axis C2. The frictional force between the third cam 26 and the second cam 96 may serve as a braking force that may slow the rotation of the first cam 91 in its rotating direction.

The second cam 96 includes the first portion 96*a* and the second portion 96*b*. The first portion 96*a* has an inclined surface (e.g., the first surface) that is inclined or angled relative to the direction along the second axis C2. The second portion 96*b* includes a flat surface that extends in parallel to the direction perpendicular to the direction along the second axis C2.

The first portion 96*a* may cause the second gear 94 to gradually move from the first position toward the second position in association with the rotation of the second gear 94. Angles of the inclined surface of the first portion 96*a* may be determined to achieve proper braking applied by the second cam 96.

The second portion 96*b* may maintain the second gear 94 at the second position in a particular phase range of the second gear 94 in its rotating direction, thereby applying the braking force to the first cam 91 stably. In addition, the second gear 94 moved to the second position may not tilt relative to the direction along the second axis C2.

The fuser 160 includes the third gear 99 engaged with the second gear 94. The third gear 99 is configured to receive drive force from the drive source.

The drive force transmission to the first cam 91 includes the second gear 94, which is used for both the drive force transmission and the braking mechanism. This configuration may reduce the number of gears to be used for the fuser 160, leading to a simplified fuser 160.

The fuser 60 includes the photo sensor 98 configured to detect a phase of the first gear 93 in its rotating direction.

Detecting the phase of the first gear 93 in its rotating direction may enable the phase of the first cam 91 in its rotating direction to be determined with high accuracy, because the first gear 93 and the first cam 91 rotate together as a unit.

What is claimed is:

1. An electrophotographic image forming apparatus, comprising:

a fuser including:

a heater configured to apply heat to a sheet;

a presser disposed facing the heater;

a support member that supports the presser to allow the presser to move between a nip position where the presser is in pressured contact with the heater, and a separated position where the presser is separated from the heater;

a first spring that urges the presser toward the heater;

a first cam configured to rotate in contact with the support member about a first axis, thereby moving the presser between the separated position and the nip position;

a first gear configured to rotate about the first axis together with the first cam, the first gear having a predetermined number of gear teeth;

a second gear engaged with the first gear and having the predetermined number of gear teeth, the second gear configured to rotate about a second axis and to move in a direction along the second axis;

a second spring that urges the second gear in the direction along the second axis; and a second cam configured to rotate together with the second gear, the second cam configured to move the second gear in the direction along the second axis, against urging force of the second spring, wherein the second cam has a cam profile that, when the presser moves from the separated position to the nip position, causes the second gear to move in the direction along the second axis against the urging force of the second spring to increase the urging force of the second spring.

2. The electrophotographic image forming apparatus according to claim 1, wherein the second cam is located on one surface of the second gear, and the second spring is located on the other surface of the second gear in the direction along the second axis.

3. The electrophotographic image forming apparatus according to claim 1, wherein the second gear is mounted on a shaft with an axis thereof aligned with the second axis, and has a peripheral surface having the predetermined number of gear teeth; and the second cam is at least partially disposed between the gear teeth and the shaft in a radial direction of the second gear, and extends from the second gear in the direction along the second axis.

4. The electrophotographic image forming apparatus according to claim 3, wherein the second spring includes a coil spring with an axis thereof aligned with the second axis, and the second cam is disposed on the second gear radially outside of the second spring in the radial direction of the second gear.

5. The electrophotographic image forming apparatus according to claim 4, wherein a diameter defined by a rotational pathway of a cam surface of the second cam is greater than a diameter of a coil of the second spring.

6. The electrophotographic image forming apparatus according to claim 1, further comprising a third cam disposed facing the second cam, the third cam configured to slidably contact the second cam.

7. The electrophotographic image forming apparatus according to claim 1, wherein the second cam includes a first portion having a surface inclined relative to the direction along the second axis, and a second portion having a surface parallel to a direction perpendicular to the direction along the second axis.

8. The electrophotographic image forming apparatus according to claim 1, further comprising a third gear engaged with the second gear, the third gear configured to receive drive force from a drive source.

9. The electrophotographic image forming apparatus according to claim 1, further comprising a detector configured to detect a phase of the first gear in a rotating direction of the first gear.

10. An electrophotographic image forming apparatus having a fuser, wherein the fuser comprises:

a heat roller;

a pressure roller disposed facing the heat roller;

a support member that supports the pressure roller to be movable between a nip position where the pressure roller is in contact with the heat roller and a separated position where the pressure roller is separated from the heat roller;

a first spring that urges the pressure roller toward the heat roller;

a first cam in contact with the support member;

a first gear having a particular number of gear teeth, the first gear being rotatable about a first axis together with the first cam;

a second gear having the particular number of gear teeth, the second gear engaging with the first gear and being rotatable about a second axis and movable along the second axis;

a second spring that urges the second gear along the second axis; and a second cam rotatable and movable together with the second gear, wherein a cam profile of the first cam and a cam profile of the second cam are determined such that:

a rotation of the first cam causes the pressure roller to move from the separated position to the nip position, and causes the first gear to rotate about the first axis;

the rotation of the first gear causes the second gear to rotate about the second axis;

the rotation of the second gear causes the second cam to rotate about the second axis;

the rotation of the second cam causes the second gear to move along the second axis, and the movement of the second gear causes the second spring to be compressed.

11. The electrophotographic image forming apparatus according to claim 10, wherein the fuser further comprises:

a sideplate; and a third cam formed on a surface of the sideplate such that the third cam faces the second cam, wherein the third cam is in contact with the second cam where the second gear is at a particular rotational phase.

12. The electrophotographic image forming apparatus according to claim 11, wherein the cam profile of the second cam and a cam profile of the third cam are determined such that the rotation of the second cam causes the second gear to move along the second axis.

13. The electrophotographic image forming apparatus according to claim 12, wherein the third cam further comprises a first cam surface, a second cam surface, and a third cam surface, the first cam surface is inclined relative to the second axis such that a downstream portion of the first cam surface in a rotating direction of the second gear extends away from the sideplate, the second cam surface is perpendicular to the second axis, and the third cam surface is inclined relative to the second axis such that a downstream portion of the third cam surface in the rotating direction of the second gear extends toward the sideplate.

14. The electrophotographic image forming apparatus according to claim 13, wherein the second cam further comprises a first portion, a second portion, and a third portion, the first portion includes a surface inclined relative to the second axis such that an upstream portion of the surface in the rotating direction of the second gear extends away from the second gear, the second portion includes a flat surface perpendicular to the second axis, and the third portion includes a surface inclined relative to the second axis such that an upstream portion of the surface in the rotating direction of the second gear extends toward the second gear.

* * * * *